United States Patent
Liao et al.

(10) Patent No.: US 10,680,234 B2
(45) Date of Patent: Jun. 9, 2020

(54) LITHIUM-SULFUR BATTERY WITH POLYANTHRAQUINONE BINDER

(71) Applicant: UCHICAGO ARGONNE, LLC, Chicago, IL (US)

(72) Inventors: Chen Liao, Westmont, IL (US); Ka-Cheong Lau, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 175 days.

(21) Appl. No.: 15/938,026

(22) Filed: Mar. 28, 2018

(65) Prior Publication Data

US 2019/0305296 A1     Oct. 3, 2019

(51) Int. Cl.
| | |
|---|---|
| *H01M 4/136* | (2010.01) |
| *H01M 4/62* | (2006.01) |
| *H01M 4/583* | (2010.01) |
| *H01M 4/66* | (2006.01) |

(52) U.S. Cl.
CPC .......... *H01M 4/136* (2013.01); *H01M 4/583* (2013.01); *H01M 4/623* (2013.01); *H01M 4/661* (2013.01)

(58) Field of Classification Search
CPC .. H01M 10/052; H01M 4/0404; H01M 4/136; H01M 4/38; H01M 4/382; H01M 4/583; H01M 4/623; H01M 4/625; H01M 4/661
See application file for complete search history.

(56) References Cited

U.S. PATENT DOCUMENTS

| | | |
|---|---|---|
| 2012/0056590 A1 | 3/2012 | Amiruddin et al. |
| 2012/0328936 A1 | 12/2012 | Wessells et al. |

FOREIGN PATENT DOCUMENTS

| | | |
|---|---|---|
| CN | 103137946 B | 8/2015 |

OTHER PUBLICATIONS

K.-C. Lau, I. A. Shkrob, N. L. Dietz Rago, J. G. Connell, D. Phelan, B. Hu, L. Zhang, Z. Zhang, C. Liao. Improved performance through tight coupling of redox cycles of sulfur and 2,6-polyanthraquinone in lithium-sulfur batteries, J. Mater. Chem. A, 2017, 5, 24103.*
G. Li, X. Wang, M. H. Seo, M. Li, L. Ma, Y. Yuan, T. Wu, A. Yu, S. Wang, J. Lu, Z. Chen.Chemisorption of polysulfides through redox reactions with organic molecules for lithium-sulfur batteries, Nature Communications 2018, 9:705, 1-10.*
Z. Song, H. Zhan, Y. Zhou. Anthraquinone based polymer as high performance cathode material for rechargeable lithium batteries, Chem. Commun., 2009, 448-450.*

(Continued)

*Primary Examiner* — Carlos Barcena
(74) *Attorney, Agent, or Firm* — Olson & Cepuritis, Ltd.

(57) ABSTRACT

A cathode for a lithium-sulfur (Li—S) battery is described herein, which comprises elemental sulfur (e.g., $S_8$) and an electroactive polyanthraquinone-containing binder. In some embodiments, the cathode also includes a conductive carbon material in addition to the sulfur and binder. Also described herein is a Li—S battery comprising the cathode, in combination with a metallic lithium-containing anode, a lithium conductive separator membrane between the anode and the cathode, and a liquid electrolyte comprising a lithium salt dissolved in a non-aqueous organic solvent.

20 Claims, 4 Drawing Sheets

(56) References Cited

OTHER PUBLICATIONS

Al Salem, H. et al., Electrocatalytic Polysulfide Traps For Controlling Redox Shuttle Process of Li—S Batteries, Journal of American Chemical Society 137, 11542-11545 (2015).
Aurbach, D. et al., Prototype Systems For Rechargeable Magnesium Batteries, Nature 407, 724-727 (2000).
Azimi, N. et al., Understanding the Effect of a Fluorinated Ether on the Performance of Lithium-Sulfur Batteries, ACS Applied Materials & Interfaces 7, 9169-9177 (2015).
Babu, G. et al., Transition Metal Dichalcogenide Atomic Layers for Lithium Polysulfides Electrocatalysis, Journal of the American Chemical Society 139, 171-178 (2017).
Bitenc, J. et al., Anthraquinone-Based Polymer As Cathode In Rechargeable Magnesium Batteries, ChemicalSusChem Communications 8, 4128-4132 (2015).
Bruce, P.G., et al., Li—O2 and Li—S Batteries With High Energy Storage, Nature Materials 11, 19-29 (2012).
Chen, L. et al., Lithium Metal Protected By Atomic Layer Deposition Metal Oxide For High-Performance Anodes, Journal of Materials Chemistry A. 5, 12297-12309 (2017).
Choi, N-S. et al., Challenges Facing Lithium Batteries and Electrical Double-Layer Capacitors, Angewandte Chemical Reviews, Int. Ed. 51, 9994-10024 (2012).
Cuisinier, M. et al., Unique Behaviour of Nonsolvents For Polysulphides in Lithium-Sulphur Batteries, Energy & Environmental Science 7, 2697-2705 (2014).
Diao, Y. et al., Insights Into Li—S Battery Cathode Capacity Fading Mechanisms: Irreversible Oxidation of Active Mass During Cycling, Journal of The Electrochemical Society 159 (11), A1816-A1821 (2012).
Dokko, K. et al., Solvate Ionic Liquid Electrolyte for Li—S Batteries, Journal of The Electrochemical Society 160 (8), A1304-A1310 (2013).
Frischmann, P.D. et al., Supramolecular Perylene Bisimide-Polysulfide Gel Networks As Nanostructured Redox Mediators in Dissolved Polysulfide Lithium-Sulfur Batteries, Chemistry of Materials 27, 6765-6770 (2015).
Fu, Y. et al., Highly Reversible Lithium/Dissolved Polysulfide Batteries With Carbon Nanotube Electrodes, Angewandte Chemical 125, 7068-7073 (2013).
Haupler, B. et al., Carbonyls: Powerful Organic Materials For Secondary Batteries, Advanced Energy Materials 5, 1-34 (2015).
Jeong, T-G. et al., Heterogeneous Catalysis For Lithium-Sulfur Batteries: Enhanced Rate Performance by Promoting Polysulfide Fragmentations, ACS Energy Letters 2, 327-333 (2017).
Ji, X. et al., A Highly Ordered Nanostructured Carbon-Sulphur Cathode For Lithium-Sulphur Batteries, Nature Materials 8, 500-506 (2009).
Kozen, A.C. et al., Next-Generation Lithium Metal Anode Engineering via Atomic Layer Deposition, ACS Nano vol. 9 (6), 5884-5892 (2015).
Lau, K-C et al., Improved Performance Through Tight Coupling of Redox Cycles of Sulfur and 2,6-Polyanthraquinone in Lithium-Sulfur Batteries, Journal of Materials Chemistry A 5, 24103-24109 (2017).
Lee, C-W et al., Directing the Lithium-Sulfur Reaction Pathway Via Sparingly Solvating Electrolytes For High Energy Density Batteries, ACS Central Science 3, 605-613 (2017).
Liang, X. et al., A Highly Efficient Polysulfide Mediator For Lithium-Sulfur Batteries, Nature Communications 6 (5682), 1-8 (2015).
Liang, Y. et al., Organic Electrode Materials for Rechargeable Lithium Batteries, Advanced Energy Materials 2, 742-769 (2012).
Liao, C. et al., The Unexpected Discovery of the Mg(HMDS)2/MgCl2 Complex As A Magnesium Electrolyte For Rechargeable Magnesium Batteries, Journal of Materials Chemistry A 3, 6082-6087 (2015).
Lin, H. et al., Electrocatalysis of Polysulfide Conversion By Sulfur-Deficient MoS2 Nanoflakes For Lithium-Sulfur Batteries, Energy & Environental Science 10, 1476-1486 (2017).
List, B., Introduction: Organocatalysis, Chemical Reviews 107 (12) 5413-5415 (2007).
Lukasiewicz, M. et al., Microwave-Assisted Oxidation of Side Chain Arenes By Magtrieve, Advanced Synth. Catal. 345, 1269-1272 (2003).
Macmillan, D., The Advent and Development of Organocatalysis, Nature 455, 304-308 (2008).
Manthiram, A. et al., Rechargeable Lithium-Sulfur Batteries, Chemical Reviews 114, 11751-11787 (2014).
Pan, B. et al., Polyanthraquinone-Based Organic Cathode for High-Performance Rechargeable Magnesium-Ion Batteries, Advanced Energy Materials 6, 1-6 (2016).
Pang, Q. et al., Advances in Lithium-Sulfur Batteries Based on Multifunctional Cathodes and Electrolytes, Nature Energy 1, 1-11 (2016).
Pang, Q. et al., Surface-Enhanced Redox Chemistry of Polysulphides On A Metallic and Polar Host For Lithium-Sulphur Batteries, Nature Communications 5 (4759), 1-8 (2014).
Song, Z. et al., Polyanthraquinone As A Reliable Organic Electrode For Stable and Fast Lithium Storage, Communication 54 (47), 13947-13951 (2015).
Suo, L. et al., A New Class of Solvent-in-Salt Electrolyte For High-Energy Rechargeable Metallic Lithium Batteries, Nature Communications 4 (1481), 1-9 (2013).
Xu, W. et al., Lithium Metal Anodes For Rechargeable Batteries, Energy & Environmental Science 7, 513-537 (2014).
Zhang, B. et al., Enhancement of Long Stability of Sulfur Cathode by Encapsulating Sulfur Into Micropores of Carbon Spheres, Energy & Environmental Science 3, 1531-1537 (2010).
Zhang, S.S., Liquid Electrolyte Lithium/Sulfur Battery: Fundamental Chemistry, Problems, and Solutions, Journal of Power Sources 231, 153-162 (2013).
Zhang, S. et al., Recent Advances in Electrolytes For Lithium-Sulfur Batteries, Advanced Energy Materials 5, 1-28 (2015).
Zheng, G. et al., Interconnected Hollow Carbon Nanospheres For Stable Lithium Metal Anodes, Nature Nanotechnology 9, 618-623 (2014).
Zhou, G. et al., Catalytic Oxidation of Li2S on the Surface of Metal Sulfides For Li—S Batteries, PNAS 114 (5) 840-845 (2017).
Zhou, Y. et al., Polyanthraquinone-Based Nanostructured Electrode Material Capable of High-Performance Pseudocapacitive Energy Storage in Aprotic Electrolyte, Nano Energy 15, 654-661 (2015).

\* cited by examiner

LITHIUM-SULFUR BATTERY WITH POLYANTHRAQUINONE BINDER

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to lithium-sulfur batteries. More particularly, this invention relates to lithium-sulfur batteries and cathodes therefor, which utilize an electrocatalytic polyanthraquinone binder in the cathode for suppressing lithium polysulfide shuttling.

BACKGROUND

With an ever-growing demand for higher capacity and lower cost of batteries in electric vehicles and portable electronics, lithium-sulfur (Li—S) batteries represent a promising alternative to the currently prevalent lithium-ion batteries. Li—S batteries offer a theoretical specific capacity of 1675 mAh/g and an energy density of 2600 Wh/kg, nearly ten times the theoretical specific capacity and five times the energy density of the current state-of-the-art lithium-ion batteries. However, Li—S batteries suffer from polysulfide shuttling, which is caused by the much faster migration of soluble lithium polysulfide species ($Li_2S_n$, 4≤n≤8) to Li anode compared to the slower redox interconversions between these soluble lithium polysulfide species and insoluble species (elemental $S_8$, $Li_2S_2$, $Li_2S$) in the cathode. Traditionally, to counter this undesired effect, the $Li_2S_n$ species needed to be confined inside the cathode. Other strategies, e.g. the use of concentrated electrolytes to lower solubility of $Li_2S_n$, and Li anode protection against shuttled $Li_2S_n$ have been suggested. However, even with these recent advances, the performance of Li—S batteries remains limited by insufficient control of polysulfide shuttling.

To overcome these limitations, electrocatalysis can be used to accelerate the interconversions between the soluble and insoluble sulfur species, thereby hampering polysulfide shuttling. Electrocatalytic systems based on nanostructured Pt and Ni, $MS_2$ (M=Ti, V, Co, Mo, W), TiN, and a perylene bisimide-$Li_2S_n$ gel network coupled with graphene nanosheets and/or nanoscale porous carbons, have been reported. The complexity of these multicomponent systems makes it difficult to probe their chemistry at a molecular level, impeding rational development of affordable yet efficient electrocatalysts. There is an ongoing need for Li—S batteries with reduced polysulfide shuttling. The cathodes and Li—S batteries described herein address this need.

SUMMARY OF THE INVENTION

A cathode for a lithium-sulfur (Li—S) battery is described herein, which comprises elemental sulfur (e.g., $S_8$) and an electroactive polyanthraquinone-containing binder, optionally coated on a current collector (e.g., an aluminum foil or sheet, or carbon). In some embodiments, the cathode also includes a conductive carbon material in addition to the sulfur and binder. Also described herein is a Li—S battery comprising the cathode in combination with a metallic lithium-containing anode, a lithium conductive separator membrane between the anode and the cathode, and a liquid electrolyte comprising a lithium salt dissolved in a non-aqueous organic solvent.

Redox-active polymers have been explored as cathodes in lithium or magnesium ion batteries. However, little is known or proven about the possibility of using them as binders. A successful example of using such a polymer as an electrocatalytic redox-active binder in a lithium-sulfur battery is described herein, which provides beneficial effects of promoting the redox interconversions between sulfur (S) and its reduced forms, and the rate capability of the battery. It is important to match the redox window of the electrocatalytic binder to the redox window of the cathode active material (in this case $S_8$). Depending on the electrolyte systems, lithium-sulfur batteries typically show two redox plateaus at about 2.3-2.4 V and about 2.0-2.1 V, respectively. The two voltages represent the reduction of $S_8$ to polysulfides ($Li_2S_n$, n=2-8) and further reduction of $Li_2S_n$ to $Li_2S$. The redox potential of poly-2,6-anthraquinone lies between approximately 2.0 V and 2.51 V, which lines up with the S redox window. When poly-2,6-anthraquinone was used as a binder component in Li—S batteries, a clear improvement in capacity retention was observed. Furthermore, the reduction mechanism of $Li_2S_x$ was further probed through independent experiments of mixing $Li_2S_n$ with poly-2,6-anthraquinone and its chemically reduced analogs.

Selected non-limiting embodiments of the cathodes and Li—S batteries described herein are summarized below to illustrate certain features and aspects of the invention or inventions described herein.

Embodiment 1 comprises a cathode for a lithium-sulfur battery comprising elemental sulfur dispersed in a binder comprising 2,6-polyanthraquinone.

Embodiment 2 comprises the cathode of embodiment 1, further comprising a current collector in contact with the sulfur and the binder.

Embodiment 3 comprises the cathode of embodiment 1 or 2, wherein the elemental sulfur and the binder are coated on an aluminum current collector.

Embodiment 4 comprises the cathode of any one of embodiments 1 to 3, wherein the cathode further comprises a carbon material dispersed in the binder.

Embodiment 5 comprises the cathode of any one of embodiments 1 to 4, wherein the 2,6-polyanthraquinone has a number average molecular weight of about 60 kDa to 80 kDa and a polydispersity index of about 2 to about 2.2, as determined by reduction of the 2,6-polyanthraquinone with about 2 equivalents of lithium naphthalenide per anthraquinone unit thereof, followed by gel permeation size exclusion chromatography using a chromatography medium comprising a highly cross-linked polystyrene-divinylbenzene gel and narrow dispersity polystyrene standards with tetrahydrofuran as eluent.

Embodiment 6 comprises the cathode of any one of embodiments 1 to 5, wherein the 2,6-polyanthraquinone comprises about 50 to about 66 percent by weight (wt %) of the binder.

Embodiment 7 comprises the cathode of any one of embodiments 1 to 5, wherein the 2,6-polyanthraquinone comprises about 50 wt % of the binder.

Embodiment 8 comprises the cathode of any one of embodiments 1 to 7, wherein the binder further comprises at least one other binder compound in combination with the 2,6-polyanthraquinone.

Embodiment 9 comprises the cathode of embodiment 8, wherein the at least one other binder compound comprises polyvinylidene difluoride.

Embodiment 10 comprises the cathode of any one of embodiments 1 to 9, wherein the cathode comprises about 50 wt % of $S_8$, about 20 to about 40 wt % of a carbon material, and about 10 to about 30 wt % of the binder.

Embodiment 11 comprises a lithium-sulfur (Li—S) battery comprising:
(a) an anode comprising metallic lithium;
(b) a cathode comprising elemental sulfur dispersed in a binder comprising 2,6-polyanthraquinone;
(c) a porous separator membrane between the anode and the cathode; and
(d) a liquid electrolyte composition comprising a lithium salt dissolved in a non-aqueous organic solvent contacting the anode, the cathode, and the membrane.

Embodiment 12 comprises the battery of embodiment 11, wherein the cathode further comprises current collector in contact with the sulfur and the binder.

Embodiment 13 comprises the battery of embodiment 11 or 12, wherein the elemental sulfur and the 2,6-polyanthraquinone are coated on an aluminum current collector.

Embodiment 14 comprises the battery of any one of embodiments 11 to 13, wherein the cathode further comprises a carbon material dispersed in the binder.

Embodiment 15 comprises the battery of any one of embodiments 11 to 14, wherein the 2,6-polyanthraquinone has a number average molecular weight of about 60 kDa to 80 kDa and a polydispersity index of about 2 to about 2.2, as determined by reduction of the 2,6-polyanthraquinone with about 2 equivalents of lithium naphthalenide per anthraquinone unit thereof, followed by gel permeation size exclusion chromatography using a chromatography medium comprising a highly cross-linked polystyrene-divinylbenzene gel and narrow dispersity polystyrene standards with tetrahydrofuran as eluent.

Embodiment 16 comprises the battery of any one of embodiments 11 to 15, wherein the 2,6-polyanthraquinone comprises about 50 to about 66 wt % of the binder.

Embodiment 17 comprises the battery of any one of embodiments 11 to 15, wherein the 2,6-polyanthraquinone comprises about 50 wt % of the binder.

Embodiment 18 comprises the battery of any one of embodiments 11 to 17, wherein the binder comprises at least one other binder compound in combination with the 2,6-polyanthraquinone.

Embodiment 19 comprises the battery of embodiment 18, wherein the at least one other binder compound comprises polyvinylidene difluoride.

Embodiment 20 comprises the battery of any one of embodiments 11 to 19, wherein the cathode comprises about 50 wt % of $S_8$, about 20 to about 40 wt % of a carbon material, and about 10 to about 30 wt % of the binder.

The Li—S batteries described herein provide a number of surprising advantages over current Li—S battery designs. In particular, the 2,6-polyanthraquinone inhibits polysulfide shuttling and leads to improved capacity retention, while also functioning as a binder for the cathode components.

DETAILED DESCRIPTION OF PREFERRED EMBODIMENTS

Figure 1:
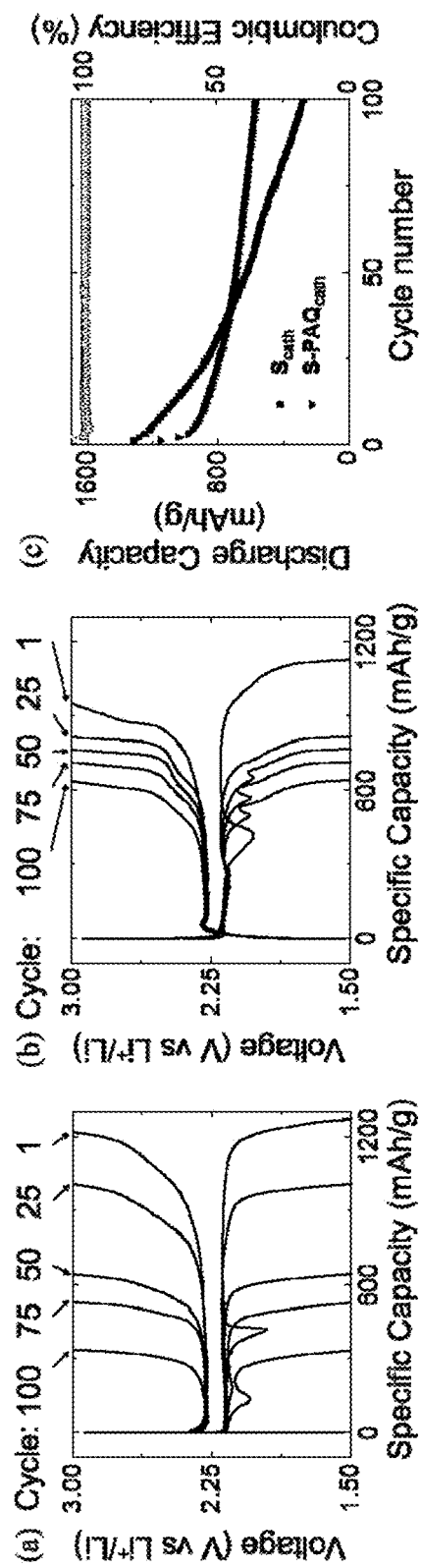
FIG. 1 provides galvanostatic performance data on coin cells cycled at 55° C. with representative discharge/charge voltage profiles of (a) a conventional S cathode ($S_{cath}$) and (b) a S-cathode comprising 2,6-PAQ binder (S-PAQ$_{cath}$), cycled at C/10 rate, and (c) a plot of specific discharge capacity (left axis, solid) and coulombic efficiency (right axis, hollow) vs. cycle number for $S_{cath}$ and S-PAQ$_{cath}$.

As described herein, polyanthraquinone (PAQ) polymers such as poly-2,6-anthraquinone (also known 2,6-polyanthraquinone) are useful as binders and organic electrocatalysts for Li—S cells. 2,6-PAQ has a redox window that nearly coincides with that of the sulfur. For example, micron-sized S particles and carbon particles were dispersed in a 2,6-PAQ-containing binder and an coated on an aluminum foil current collector to form a cathode, which was coupled with a Li metal anode and an electrolyte comprising lithium bis(acetonitrile)-bis(trifluoromethane)sulfonimide ((CH$_3$CN)$_2$LiTFS) in 1,1,2,2-tetrafluoroethyl 2,2,3,3-tetrafluoropropyl ether (TTE) solvent in a Li—S battery to evaluate the effects of 2,6-PAQ on galvanostatic cycling of Li—S cells. The 2,6-PAQ lowered the solubility of Li$_2$S$_n$ (0.2 g/L at 70° C. for n=6) species and improved the cycling performance of the battery relative to a similar battery with a binder that did not include 2,6-PAQ.

Non-limiting examples of non-aqueous solvents for use in the electrolyte of the Li—S batteries described herein include one or more solvent selected from an ether, a fluorinated ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether such as 1,3-dioxolane, 1,2-dimethoxyethane (also known as glyme), or diglyme; a linear dialkyl carbonate such as dimethyl carbonate (DMC), diethyl carbonate (DEC), ethyl methyl carbonate (EMC) and the like; a cyclic alkylene carbonate such as ethylene carbonate (EC), propylene carbonate (PC) and the like; a sulfolane such as sulfolane or an alkyl-substituted sulfolane; or a sulfone such as a dialkyl sulfone (e.g. methyl ethyl sulfone).

Preferably the solvent comprises an organic ether or a fluorinated organic ether. Non-limiting examples of fluorinated organic ethers include, e.g., compounds represented as R'—O—R", where R' is a partially fluorinated or perfluorinated alkyl group, and R" is a partially fluorinated or perfluorinated alkyl group, R' and R" optionally can include additional oxygen atoms in the alkyl chain or a substituent, as in a partially or perfluorinated ether group. For example, either or both of R' and R" may be a partially fluorinated or perfluorinated polyethylene glycol, polypropylene glycol, or polybutylene glycol residue. Illustrative non-polar fluorinated ether solvents include, but are not limited to 1,1,2,2-tetrafluoroethyl-2,2,3,3-tetrafluoropropyl ether (TTE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; and difluoromethyl-2,2,3,3-tetrafluoropropyl ether. In some cases, R' and R" are linked together to form a cyclic fluorinated ether. The solvent can comprise a single solvent compound or a mixture of two or more solvent compounds.

The separator membrane of the Li—S battery can be any separator membrane that is compatible with conventional Li—S batteries, which are well known in the battery art. Non-limiting examples of separator membranes include microporous polymeric membrane, such as CELGARD brand membranes (e.g., microporous polypropylene membranes, or microporous polypropylene/polyethylene/polypropylene membranes and the like).

The metallic lithium containing anode can be a lithium metal sheet or foil, or can comprise metallic lithium in a porous substrate, such as a porous metal substrate (e.g., nickel foam, and the like).

The current collector for the cathode can be, e.g., any conductive material that is stable at the cathode operating potential, such as a metal (e.g., aluminum), or a carbon material (e.g., carbon paper, microstructured carbon, nanostructured carbon, and the like).

The cathode can comprise a carbon material (e.g., carbon black, nanoparticulate carbon, microparticulate carbon, carbon nanotubes, graphene, and the like) in addition to the sulfur and the PAQ-containing binder. The binder also can comprise a conventional binder material such as polyvinylidene difluoride (also known as poly(vinylidene difluoride) of polyvinylidene fluoride; PVdF), a polyurethane, a polyethylene oxide (PEO), a styrene-butadiene rubber (SBR), a carboxymethylcellulose (CMC), a polyvinylpyrrolidone (PVP), and the like, in addition to the 2,6-PAQ. In some embodiments, the 2,6-PAQ has a number average molecular weight in the range of 60 to 80 kDa (e.g., about 65 to 75 kDA, or about 70 to 72 kDa) and a polydispersity of about 2 to about 2.2, as determined by the method described in Ex. 1, herein, e.g., by reduction of the 2,6-PAQ and subsequent gel permeation size exclusion chromatography.

As demonstrated herein, the presence of 2,6-polyanthraquinone (2,6-PAQ) in the cathode improves capacity retention, inhibits Li corrosion and reduces S deposition. All of these improvements are consistent with a mechanism in which the 2,6-PAQ polymer reduces polysulfide shuttling as envisioned in Scheme 2, below.

The following non-limiting examples are provided to illustrate certain aspects and features of the Li—S batteries described herein.

EXAMPLES

Ex. 1. Materials Preparation

A number of chemicals used herein were purchased from Sigma-Aldrich, and used as received, for example: 2,6-dibromoanthraquinone, bis(pinacolato)diboron, 1,1'-bis(diphenylphosphino)ferrocene]di-chloropalladium(II) ((DPPF)PdCl$_2$), K$_2$CO$_3$, anhydrous toluene, CH$_2$Cl$_2$, CHCl$_3$, CH$_3$OH, 2,3-dichloro-5,6-dicyano-1,4-benzoquinone (DDQ), THF, sulfur (100 mesh) and anhydrous N-methyl-2-pyrrolidone (NMP). Acetonitrile (CH$_3$CN) and 1,2-dimethoxyethane (DME) were purchased from Sigma-Aldrich and dried over 3 Å molecular sieves before use. Conductive carbon C45 nanoparticles (60-70 nm) were purchased from Timcal. Lithium bis(trifluoromethane)sulfonamide (LiTFSI) was purchased from Solvionic and dried at 150° C. under vacuum overnight prior to use. Polyvinylidene difluoride (PVdF) was purchased from Solvay. 1,1,2,2-tetrafluoroethyl 2,2,3,3-tetrafluoropropyl ether (TTE) was purchased from SynQuest and dried over 3 Å molecular sieves overnight before use.

A. Synthesis of 2,6-Polyanthraquinone and Lithiated Derivatives Thereof (See Scheme 1)

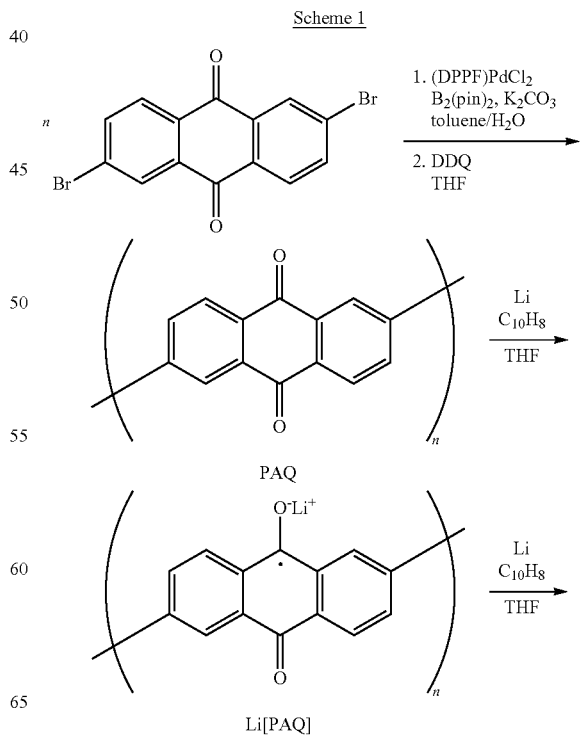

-continued

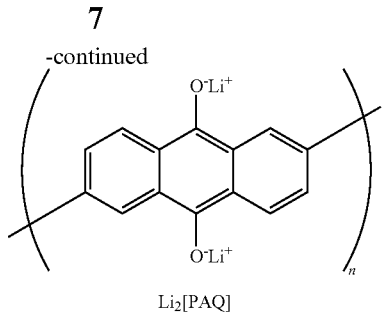

Li$_2$[PAQ]

Synthesis of 2,6-Polyanthraquinone 2,6-Dibromoanthraquinone (10.0 g, 27.3 mmol), bis(pinacolato)diboron (7.01 g, 27.6 mmol), (DPPF)PdCl$_2$ (1.17 g, 1.60 mmol), toluene (1 L), and a solution of K$_2$CO$_3$ in deionized water (0.5 M, 200 mL, 100 mmol) were placed in a Schlenk flask. The resulting suspension was sparged with N$_2$ for about 30 minutes (min) at room temperature, and then stirred at about 130° C. in a sand bath under N$_2$. After about three days, the mixture was cooled down to room temperature and poured into CH$_2$Cl$_2$ (500 mL) under ambient pressure. The resulting precipitate was filtered out and washed sequentially with water, CH$_3$OH, CHCl$_3$, and toluene. The solid was then suspended in THF (15 mL), and DDQ (7.95 g, 35.0 mmol) was then added to this mixture. The reaction mixture was stirred at room temperature for DDQ 12 hours (h). The solution was then filtered, and a dark brown solid material was collected on the filter. This material was washed with THF and dried under vacuum at DDQ 100° C. for DDQ 10 h to yield a brown powder (7.49 g). The infrared (IR) spectrum of this powder closely resembled the known IR spectrum of 2,6-polyanthraquinone. One of the minor bands in in the spectrum of the product coincides with the C=C stretch in 2-bromoquinone, which may originate from a small fraction of the brominated chain termini (as is also suggested by X-ray photoelectron spectra).

This powder also was analyzed using X-ray photoelectron spectroscopy (XPS), which indicated a C:O atomic ratio of about 7:1, which is consistent with the C$_{14}$O$_2$H$_x$ backbone of 2,6-PAQ; trace amount of Br atoms from the polymer chain termini were also observed. A Pd 3d core level spectrum indicated the presence of trace amount of Pd atoms (<0.1 at %) which were not observed in the starting AQ material.

Synthesis of Lithium 2,6-Polyanthraquinonide (Li[2,6-PAQ])

Under Ar, freshly cut lithium (3.7 mg, 0.53 mmol) and naphthalene (78 mg, 0.61 mmol) were placed in a glass vial. As THF (2 mL) was added, the mixture turned dark green in about 5 seconds (s). The mixture was stirred at room temperature for about 5 min to yield a homogeneous dark green solution. 2,6-PAQ (112.5 mg, nominally 0.55 mmol AQ units) was added to this solution, and the mixture was stirred for additional 15 min to give a dark brown slurry. The brown supernatant was decanted, and the residue was washed with n-pentane (5 mL×3) to afford Li[2,6-PAQ] as a dark brown powder (102 mg, 0.48 mmol AQ units, 91% yield).

Synthesis of Dilithium 2,6-Polyanthraquinonide (Li$_2$[2,6-PAQ])

Under Ar, freshly cut lithium (6.1 mg, 0.88 mmol) and naphthalene (120 mg, 0.94 mmol) were placed in a vial. THF (2 mL) was added, and the mixture turned dark green in about 5 s. The mixture was then stirred at room temperature for about 3 min to yield a homogeneous dark green solution. 2,6-PAQ (92.1 mg, nominally 0.45 mmol AQ units) was added to this solution, and the mixture was stirred for 15 min to give a brown-red slurry. The red supernatant was decanted, and the residue was washed with n-pentane (5 mL×3) to give Li$_2$[2,6-PAQ] as a red powder (93 mg, 0.42 mmol AQ units, 95% yield). Li$_2$[2,6-PAQ] was suspended in THF, filtered and analyzed using gel permeation—size exclusion chromatography. The elution of Li$_2$[2,6-PAQ] in THF was carried out at about 1 mL/min and about 30° C. using an AGILENT 1260 INFINITY II chromatograph with a refractive index detector. A PLGEL 5 µm guard column and three PLGEL 5 µm mixed-B columns (all from Agilent) were used in combination. Narrow-dispersity polystyrene standards (AGILENT EASIVIAL PS-M) were used for calibrations, and the data were processed using CIRRUS GPC/SEC software. The number average molecular weight ($M_n$) of Li$_2$[2,6-PAQ] was about 71 kDa and the polydispersity index ($M_w/M_n$, which is the ratio of the mass and the number average molecular weight) was about 2.14. From these GPC results, it is reasonable to conclude that the number average molecular weight and polydispersity index of the 2,6-PAQ, itself, are similar to the values determined for Li$_2$[2,6-PAQ]. According to the manufacturer, PLGEL columns utilize a chromatography medium comprising a highly cross-linked polystyrene-divinylbenzene gel.

B. Synthesis of Lithium Tetrasulfide (Li$_2$S$_4$), Electrolytes and Cathodes

Synthesis of Lithium Tetrasulfide (Li$_2$S$_4$)

Under N$_2$, S$_8$ (513.8 mg, 2.0 mmol) and THF (10 mL) were placed in a Schlenk flask to form a yellow suspension. A solution of LiEt$_3$BH in toluene (1 M, 8 mL, 8 mmol) was added dropwise to this suspension and it gradually turned to a homogeneous orange solution with the concomitant gas evolution. Volatiles were removed under vacuum to afford nominally Li$_2$S$_4$ compound as an orange-yellow powder.

Preparation of (CH$_3$CN)$_2$LiTFSI/TTE Electrolyte

Two molar equivalents of acetonitrile were added to LiTFSI and the resulting mixture was stirred at room temperature to give a clear viscous solution. An equal volume of TTE was added to this solution, and the mixture was stirred further to form a homogeneous electrolyte solution of (CH$_3$CN)$_2$LiTFSI/TTE.

Preparation of Sulfur Cathodes

Sulfur cathodes (S$_{cath}$) were prepared by casting a slurry containing approximately 50 percent by weight (wt %) bulk sulfur, 40 wt % C45 carbon, and 10 wt % polyvinylidene difluoride (PVdF) in N-methyl-2-pyrrolidone (NMP) on an Al current collector. 2,6-PAQ-containing sulfur cathodes (S-PAQ$_{cath}$) were prepared by casting a slurry of about 45 wt % bulk sulfur and 36 wt % C45 carbon in a binder comprising about 9 wt % PVdF and 9 wt % 2,6-PAQ in NMP, on an Al current collector (weight ratio of S:C:PVdF: PAQ=about 5:4:1:1). These laminated cathodes were dried at about 55° C. overnight at ambient pressure, punched at a diameter of about 14 mm, and then further dried at about 50°

C. overnight under vacuum. Sulfur loading of these cathodes was determined to be about 1 mg/cm$^2$.

Preparation of Sulfurless PAQ Cathodes

Sulfurless PAQ cathodes (PAQ$_{cath}$) were prepared by casting a slurry of about 66 wt % C45 carbon, 17 wt % PVDF and 17 wt % 2,6-PAQ in NMP (exact weight ratio of C:PVDF:2,6-PAQ=4:1:1) onto an Al current collector. These laminated cathodes were dried at about 55° C. overnight at the ambient pressure, punched at a diameter of about 14 mm, and then further dried at about 50° C. overnight under vacuum.

C. Reactions of 2,6-PAQ Derivatives with Sulfur Species

Under Ar, a 2,6-PAQ polymer (2,6-PAQ, Li[2,6-PAQ] or Li$_2$[2,6-PAQ]; 20 mg) was placed in a glass vial. A solution of Li$_2$S$_4$ in DME (nominally 50 mM, 2 mL, 0.10 mmol), a suspension of Li$_2$S in DME (nominally 65 mM, 2 mL, 0.13 mmol), a suspension of Li$_2$S$_4$ in (CH$_3$CN)$_2$LiTFSI/TTE (50 mM, 2 mL, 0.10 mmol) or a suspension of Li$_2$S in (CH$_3$CN)$_2$LiTFSI/TTE (50 mM, 2 mL, 0.10 mmol) was added, and the given mixture was stirred at about 55° C. for about 24 h. Volatiles were removed under vacuum, and the resulting solid residues were analyzed using infrared spectroscopy.

Ex. 2. Analytical Methods

A. Electrode Surface and Morphology Characterization

Electrodes were harvested from charged Li—S cells after a pre-set number of charge-discharge cycles. The cells were disassembled inside an Ar-filled glovebox, and electrodes were thoroughly rinsed with 1,2-dimethoxyethane (DME), and dried prior to scanning electron microscopy/energy-dispersive X-ray spectroscopy (SEM/EDS) examinations and X-ray photoelectron spectroscopy (XPS) analysis.

For SEM/EDS analysis, the electrode samples were mounted in an air-tight holder and transferred into the SEM column. Imaging and EDS analysis was performed using a JEOL JSM 6610LV microscope equipped with an OXFORD AZTEC EDS system, operating at 10 or 15 kV for imaging and 15 kV for EDS. Semi-quantitative elemental analysis is reported in atomic percent (at %), with an error of ±3 at %.

XPS measurements were performed using a SPECS PHOIBOS 150 hemispherical energy analyzer with a monochromated Al Kα X-ray source. The load-lock of the analytical ultra-high vacuum system was connected directly to an Ar-filled glove box, enabling the loading of samples without any exposure to ambient atmosphere. Charge neutralization was carried out using a low energy flood gun (electron energy ≤5 eV), with the neutralization conditions optimized based on the degree of charging present for a given sample. Survey spectra were obtained using a pass energy of about 40 eV at a resolution of about 0.2 eV/step and a total integration time of about 0.2 sec/point. Core level spectra were obtained using a pass energy of about 20 eV with a resolution of about 0.05 eV/step and a total integration time of about 0.5 sec/point. Deconvolution of these spectra was performed using CASAXPS software with a Shirley-type background and 70-30 Gaussian-Lorentzian peak shapes. These spectra were charge referenced using the position of aliphatic carbon in the C is peak at 284.8 eV.

B. Other Supporting Measurements

Magnetometry of Li[2,6-PAQ] was carried out using a QUANTUM DESIGN Magnetic Property Measurement System 3 by warming the sample from 2 K to 300 K in a flow of helium in 1 kOe.

Continuous-wave Electron Paramagnetic Resonance (EPR) spectroscopy was used to characterize the reduced PAQ polymers suspended in liquid solutions at 300 K. To this end, 100 μL aliquots were placed in the borosilicate glass capillaries and these capillaries were then sealed in glass tubes to prevent contact with air. The first-derivative EPR spectra were obtained using a BRUKER ESP300E X-band spectrometer operating at 9.4383 GHz, 2 mW, and 0.2 G field modulation at 100 kHz. The hyperfine structure in these EPR spectra was analyzed using a WINSIM program suite.

Ex. 3. Electrochemical Evaluation

2032-Type coin cells were assembled under Ar using metallic lithium as the anode (15 mm in diameter), CELGARD 2325 (16 mm in diameter) as the separator, (CH$_3$CN)$_2$LiTFSI/TTE as the electrolyte, and the electrode prepared as stipulated above as the cathode (14 mm in diameter). The electrolyte-to-S ratio was about 10 mL of electrolyte per gram of S. Galvanostatic cycling of the 2032 coin cells was performed at a temperature of 55° C. and a current rate of C/10 (1 C=1675 mA/g) on a MACCOR series 4000 cycler over a 1.5 to 3.0 V voltage range. Cyclic voltammetry was performed on the 2032 coin cells as described above at a temperature of 55° C. and a scan rate of 0.1 mV/s using GAMRY REFERENCE 600+ analyzer. The cycling data were obtained in duplicates, and the averages are reported.

Electrochemical performance evaluations of Li—S cells were performed using S cathode (S$_{cath}$), PAQ-containing S cathode (S-PAQ), and the sparingly solvating electrolyte (CH$_3$CN)$_2$LiTFSI/TTE. Representative galvanostatic discharge/charge voltage profiles of S$_{cath}$ and S-PAQ$_{cath}$ cells are shown in FIG. 1, Panels (a) and (b), respectively. The profiles of the first discharge for both of these cells consist of two plateaus at 2.2 V (vs. Li$^+$/Li; the same reference voltage is used henceforward) connected by a voltage dip at about 450 mAh/g, which is characteristic of this sparingly solvating electrolyte. Previous studies suggested that the discharge proceeds through a reduction of S$_8$ to Li$_2$S$_4$ (first plateau), and a subsequent reduction of a dissolved Li$_2$S$_n$ species to a catalytic Li$_2$S$_n$ species (e.g., reduction of Li$_2$S$_6$ to Li$_2$S$_3$; second plateau) that catalyses the chemical conversion of S$_8$ to Li$_2$S$_4$ and Li$_2$S$_4$ to Li$_2$S. The initial build-up of this catalytic Li$_2$S$_n$ species produced the dip-like response on the discharge voltage profile.

The charging curves of these cells show only a single plateau at about 2.3 V that corresponds to the oxidation of Li$_2$S to Li$_2$S$_n$ then to S$_8$. However, as cycling proceeded further, another dip appeared near the end of the discharge curves for S-PAQ$_{cath}$ cells but not for S$_{cath}$ cells. This additional dip, unlike the first dip that features the redox catalysis by a Li$_2$S$_n$ species, recovered only to 2.1 V, and the capacity quickly decayed afterwards. Upon charging, the voltage profile of S-PAQ$_{cath}$ cells shows an additional shallow plateau at about 2.4 V. These additional features suggest the presence of a second catalytic species that is associated with 2,6-PAQ, with reduction at 2.1 V and oxidation at 2.4 V. After 100 cycles, $S_{cath}$ cells only retained 21% (280 mAh/g) of the initial discharge capacity (1319 mAh/g), whereas S-PAQ$_{cath}$ cells retained 50% (572 mAh/g) of the initial discharge capacity (FIG. 1, Panel (c); 1154 mAh/g). These results demonstrate the occurrence of PAQ-mediated S redox processes and an improved capacity retention (by about 30%) compared to $S_{cath}$.

Figure 2:
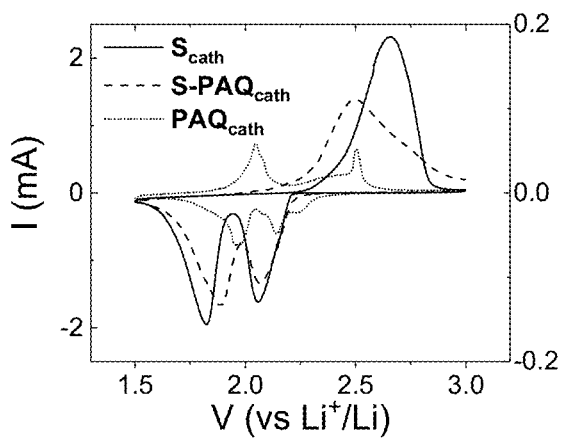
FIG. 2 provides cyclic voltammograms at a scan rate of 0.1 mV/s and 55° C. with $S_{cath}$, S-PAQ$_{cath}$, or PAQ$_{cath}$ as cathodes. Left axis: $S_{cath}$ and S-PAQ$_{cath}$, right axis: PAQ$_{cath}$.

To elucidate the role of PAQ in the S redox chemistry, cyclic voltammetry was performed for 2032 coin cells with $S_{cath}$, S-PAQ$_{cath}$ and sulfurless PAQ cathodes (PAQ$_{cath}$) at a scan rate of 0.1 mV/s (FIG. 2). Both the cyclic voltammograms (CV) of $S_{cath}$ and S-PAQ$_{cath}$ cells show two reduction peaks followed by a broad oxidation peak. The CV of S-PAQ$_{cath}$ cells (FIG. 2, dashed line) shows that the first $S_8 \rightarrow Li_2S_n$ reduction peak ($4 \leq n \leq 8$) remained unshifted (2.06 V), while the second $Li_2S \rightarrow Li_2S$ reduction peak occurred at 1.89 V, which is about 70 mV higher than the corresponding peak from $S_{cath}$ cells (1.82 V; FIG. 2, solid line) and shifted toward the voltage value of reduction of $[2,6\text{-PAQ}]^{1-/2-}$ (1.97 V; FIG. 2, dotted line). The onset of the broad oxidation wave for $Li_2S_n$ for S-PAQ$_{cath}$ cells occurred at about 2.05 V, which is about 190 mV lower than that for $S_{cath}$ cells (2.24 V). This potential approximately corresponds to the $2,6\text{-PAQ}]^{2-/1-}$ oxidation couple (2.06 V), while the oxidation peak of $[\text{PAQ}]^{2-/1-}$ was not observed in the CV of S-PAQ$_{cath}$. This broad oxidation wave reached a maximum at about 2.50 V, which is about 160 mV lower than this potential for $S_{cath}$ cells (2.66 V); this maximum is close to the oxidation potential for $[2,6\text{-PAQ}]^{1-/0}$ (2.51 V).

These CV results are consistent with the mechanism shown in Scheme 2. During discharge/cathodic scan, 2,6-PAQ and $S_8$ are electrochemically reduced to $[2,6\text{-PAQ}]^{2-}$ and $Li_2S_n$ species (first reduction of S) respectively. $[2,6\text{-PAQ}]^{2-}$ then facilitates the reduction of $Li_2S_n$ to $Li_2S$ yielding $[2,6\text{-PAQ}]^-$ in the process, which is electrochemically reduced to regenerate $[\text{PAQ}]^{2-}$. During charge/anodic scan, $[2,6\text{-PAQ}]^{2-}$ is oxidized first to $[2,6\text{-PAQ}]^-$ and then to 2,6-PAQ. The 2,6-PAQ oxidizes $Li_2S$ and $Li_2S_n$ to $S_8$ and forms $[2,6\text{-PAQ}]^-$, which is then electrochemically oxidized to regenerate 2,6-PAQ, thus completing a catalytic cycle. The electrochemical regeneration of these species leads to potential shifts in the S redox conversions observed for S-PAQ$_{cath}$ cells toward the values of redox couples for the corresponding PAQ-based species. Based on these results, the redox reactions of S species mediated by PAQ species may, in fact, be faster than the direct electrochemical reactions of these S species, hence leading to the observed improvement in cycling performance of S-PAQ$_{cath}$ over $S_{cath}$ cells. While there is no direct kinetic evidence for such catalysis, the results described herein demonstrate that the reactions postulated in Scheme 2 did occur in the utilized electrolyte.

Scheme 2.

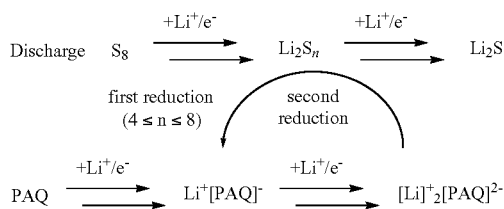

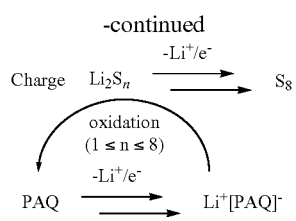

Ex. 4. Mechanistic Investigation 2,6-PAQ is composed of repeating redox-active 2,6-anthraquinone (AQ) units that can each accept one or two electrons. 2,6-PAQ was polymerized from 2,6-dibromoanthraquinone via Pd-catalysed tandem borylation/coupling reactions (Scheme 1 and Ex. 1). The vibrational frequencies of 2,6-PAQ (CO: 1675 cm$^{-1}$, CC: 1592 cm$^{-1}$ and CH: 3072 cm$^{-1}$) correspond well to the ones reported for anthraquinone (CO: 1680 cm$^{-1}$, CC: 1592 cm$^{-1}$, CH: 3074 cm$^{-1}$). The presence of trace amounts of Br in the polymer chain termini was suggested by an XPS spectrum of the material.

Stoichiometric chemical reduction of 2,6-PAQ by lithium naphthalenide in tetrahydrofuran (THF) generated the monoanionic Li[2,6-PAQ] and dianionic $Li_2$[2,6-PAQ] polymers. $Li_2$[2,6-PAQ] is sparingly soluble in THF (about 1 mg/mL), which allowed determination of the molecular weight using gel permeation chromatography (see Ex. 1 for method). The latter analysis yielded the number average molecular weight (M of about 71 kDa and suggested moderate polydispersity (the ratio of the weight and number average molecular weight, $M_w/M_n$ was about 2.14). Li[2,6-PAQ] was paramagnetic at room temperature, suggesting the presence of unpaired electrons in polymer chains.

The tentative structure of Li[2,6-PAQ] with the repeating Li$^+$AQ$^-$ units bearing localized unpaired electrons is shown in Scheme 1. A magnetometry measurement on this polymer indicated that it contained an unpaired electron in every AQ$^-$ unit with the effective moment of about 1.67$\mu_B$, and these Li$^+$AQ$^-$ units formed antiferromagnetically-coupled, alternating spin-1/2 chains. EPR measurements of the polymer in THF indicated that Li$^+$ ions were closely associated with these AQ$^-$ units, and the proton hyperfine coupling constants in these units are similar to the corresponding constants in the semiquinone radical of anthraquinone. These observations strongly support the hypothesized Li[2,6-PAQ] structure. Given this insight, IR and EPR spectroscopies were used to demonstrate that the same Li[2,6-PAQ] polymer could be obtained through the reaction of 2,6-PAQ with $Li_2S_n$ species that is depicted in Scheme 2.

Figure 3:
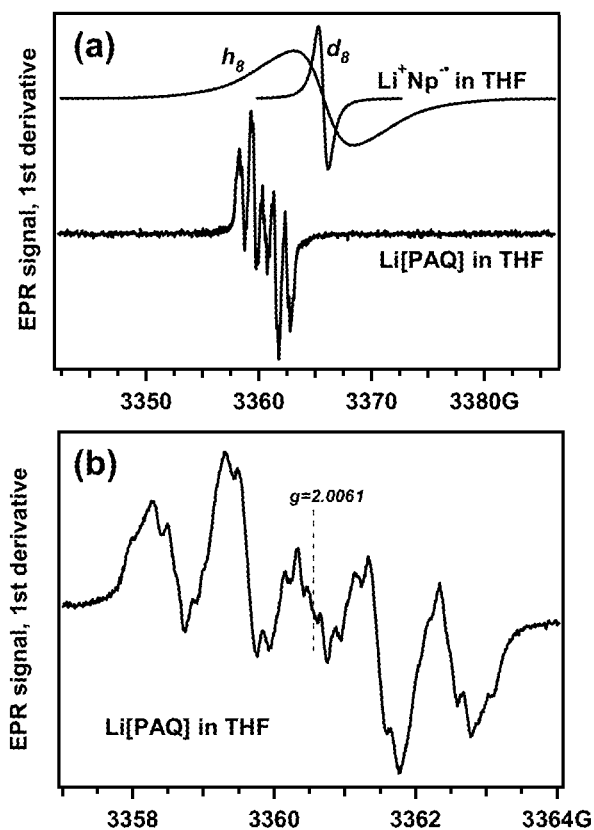
FIG. 3 provides first-derivative X-band continuous wave EPR spectra of (a) lithium $h_8$- or $d_8$-naphthalenide in THF at 25° C. (g=2.0038 signals shown at the top) and the multiplet of resonance lines indicating well resolved hyperfine structure from the suspended Li[2,6-PAQ] polymer in the same solvent (g=2.0061 signal shown to the bottom). The central section of this EPR spectrum is shown separately in Panel (b).

FIG. 3 shows the EPR spectrum of the Li[PAQ] polymer suspended in THF. For comparison, EPR resonances from the naphthalenide radical anions (Np$^-$) in THF with g=2.0038 are shown (note that H/D substitution in these anions causes the "collapse" of the resonance line since the hyperfine coupling constants for the deuterons are only about 15% of the proton ones). Unreacted Np$^-$ was completely removed. The residual EPR signal is a multiplet of resonance lines with g=2.0061. This g-factor is considerably higher than 2.0043-2.0045 reported for isolated anthraquinone semiquinone radicals, AQ$^{-\bullet}$ and Li$^+$AQ$^{-\bullet}$, in THF. Comparisons with the reported proton hyperfine coupling constants (hfcc's) for these two radicals suggests that the observed EPR signal originates from non-interacting spin-1/2 centers on the polymer chain, whose hfcc's are fairly close to the ones reported for the free Li$^+$AQ$^{-\bullet}$ radicals and rather different from the free AQ⁻• radical anions. This analysis suggests that in Li[2,6-PAQ] suspension in THF (i) the Li⁺ ions are strongly associated with the AQ⁻• units in the polymer chains, thereby breaking the local central symmetry of the AQ⁻• units; (ii) as the polymer chains move, these AQ radicals rapidly tumble, so there is efficient averaging of anisotropic magnetic interactions, and (iii) these AQ⁻• radicals weakly interact with each other despite their local high concentration. The relative weakness of these magnetic interactions can be explained by poor conjugation in the $(Li^+AQ^{-\bullet})_\infty$ chains: the neighboring aromatic moieties are nearly perpendicular to each other, so the spin exchange and magnetic dipole-dipole interactions are greatly reduced.

The EPR spectrum of Li[2,6-PAQ] polymer in THF is shown in FIG. 3, Panel (a). In this experiment, 2,6-PAQ suspended in THF was reduced using 1 equivalent of lithium $h_8$-naphthalenide. The extracted Li[2,6-PAQ] polymer was dried under argon to the constant weight and used in the subsequent experiments. In the control experiments, Li[2,6-PAQ] polymer was synthesized using perdeuterated naphthalene. No difference in the properties between the two materials was found. Importantly, magnetic measurements of the Li[2,6-PAQ] polymer indicated that in this polymer nearly every unit contained an unpaired electron, i.e. the EPR signal originated from the spin centers in the polymer chains as opposed to a paramagnetic impurity. These magnetic measurements also suggested that 300 K corresponds to the high-temperature limit in which the spin exchange coupling between the neighboring spins on the polymer chain can be neglected.

Figure 4:
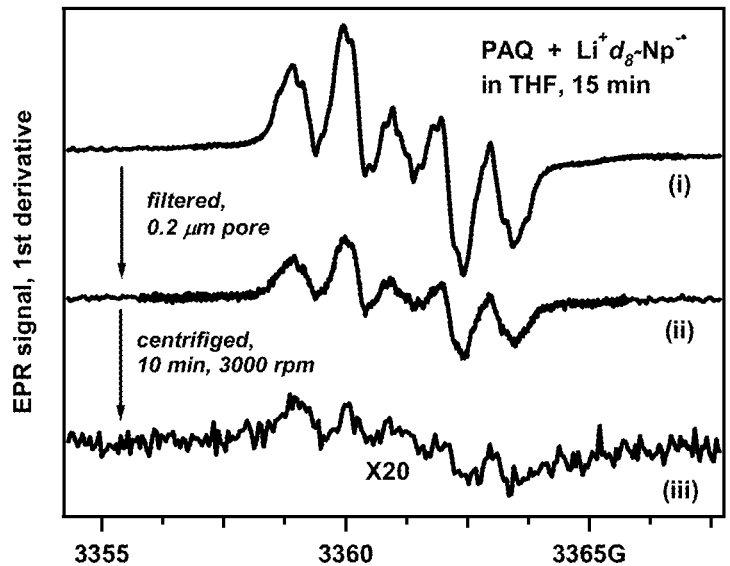
FIG. 4 provides data from in situ formation of Li[2,6-PAQ] in THF. First-derivative X-band continuous wave EPR spectra of (i) equimolar mixture of PAQ and lithium $d_8$-napthalenide obtained 15 min after the initiation of the PAQ reduction, by which time the EPR signal of Li$^+$Np$^{-•}$ (a narrow singlet at g=2.0038) disappeared and the EPR signal of Li[2,6-PAQ] at g=2.0061 appeared; (ii) EPR spectrum after passing of this reaction mixture through a 0.2 µm pore Teflon filter, which removed 60% of the observed EPR signal; and (iii) EPR spectrum after further centrifuging this filtrate for 10 min at 3,000 rpm, which removed almost all of the observed EPR signal, with an amplification factor of X20 for trace (iii).

FIG. 4 shows EPR spectra from in situ generation of the Li[2,6-PAQ] polymer. The suspension of 2,6-PAQ in THF was treated with 1 equivalent of lithium $d_8$-naphthalenide. About 15 min into this reaction, the EPR signal from the naphthalenide entirely disappeared, and the characteristic multiplet of the resonance lines from the Li[2,6-PAQ] polymer appeared (compare FIG. 3 and FIG. 4). The EPR signal in this reaction mixture originates entirely from the suspended polymer particles. Indeed, passing of the suspension through a 0.2 μm pore TEFLON filter removed 60% of the initial EPR signal, and further centrifuging of this filtrate removed 95% of the initial EPR signal (see FIG. 4). Thus, the EPR signal from Li[2,6-PAQ] (despite the excellent averaging of magnetic anisotropies) originates from the polymer particles as opposed to isolated polymer chains in the solution. All of these observations indicate considerable chain mobility of Li[2,6-PAQ] coils in THF.

The IR absorption spectra of $Li_x[2,6-PAQ]$ showed decreased intensity of C=O stretch at 1675 cm⁻¹ and a shift in C—O stretch from 1438 cm⁻¹ (x=1) to 1372 cm⁻¹ (x=2), respectively, compared to 2,6-PAQ. The extent of the reduction of 2,6-PAQ can be estimated by comparing the relative absorbances of C=O and C—O stretches. The reaction of a nominal solution of $Li_2S_4$ in $(CH_3CN)_2LiTFSI/TTE$ or DME with 2,6-PAQ over 24 hours led to the complete conversion of 2,6-PAQ to Li[2,6-PAQ]. These observations are fully consistent with Scheme 2.

Figure 5:
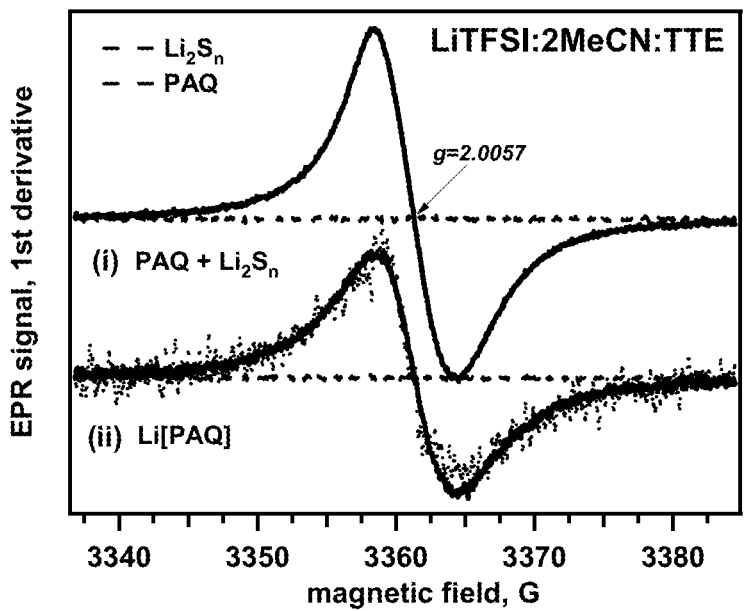
FIG. 5 provides a first-derivative X-band continuous wave electron paramagnetic resonance (EPR) spectra of (a) 1:1 suspension of 2,6-PAQ and Li$_2$S$_4$ and (ii) a suspension of Li[2,6-PAQ] in (CH$_3$CN)$_2$LiTFSI/TTE (solid line); the dotted line in the same plot indicates the scaled EPR spectrum from Li[2,6-PAQ] in (CH$_3$CN)$_2$LiTFSI/TTE containing no LiTFSI salt; the EPR spectra were obtained at 25° C.; the magnetic field is given in the units of Gauss (1 G=10$^{-4}$ T); also shown (flat dashed lines) are the EPR spectra from the suspensions of 2,6-PAQ and Li$_2$S$_4$ separately, showing no paramagnetic species present before the chemical reaction takes place.

To further establish the formation of Li[2,6-PAQ] in the reaction of 2,6-PAQ with $Li_2S_4$ in $(CH_3CN)_2LiTFSI/TTE$, EPR experiments were carried out. The suspended Li[2,6-PAQ] particles in this solution (FIG. 5, spectrum (b)) yielded an asymmetric, poorly resolved singlet resonance line at g=2.0057, indicating insufficient averaging of the magnetic anisotropies in the $Li^+AQ^-$ units, as the movement of polymer coils in this solution appears to be inhibited compared to in THF. Nearly the same EPR signal was observed when 2,6-PAQ was reacted in situ in $(CH_3CN)_2LiTFSI/TTE$ with $Li_2S_4$ (FIG. 5, spectrum (a)), i.e. this reaction generates a polymer with the similar properties to Li[2,6-PAQ] polymer obtained by chemical reduction of PAQ in THF using the lithium naphthalenide. This EPR experiment independently supports that 2,6-PAQ is reduced by $Li_2S_4$ to Li[2,6-PAQ] in $(CH_3CN)_2LiTFSI/TTE$ electrolyte, thereby corroborating the IR analysis.

A very similar EPR signal (albeit a weaker one) was observed when Li[2,6-PAQ] polymer was suspended in $CH_3CN/TTE$ mixture with and without LiTFSI. The same broad EPR singlet was observed in neat TTE, whereas the EPR signal in neat $CH_3CN$ was much narrower: the peak-to-peak distance decreased from 7.4 G in TTE to 2.8 G in $CH_3CN$. While the EPR line in $CH_3CN$ was not resolved (as opposed to THF), the second moment $M_2$ of this resonance line (1.93 G²) is very close to that of Li[2,6-PAQ] in THF, $M_2 \approx 1.87$ G², suggesting that this resonance line originates from the same $Li^+AQ^{-\bullet}$ radicals, albeit inhomogeneously broadened due to their slower tumbling. It appears, therefore, that the transformation of the EPR spectrum into the broad Lorentzian line is caused specifically by the TTE component in the solution. Once TTE replaces THF molecules solvating the Li⁺ ions, the polymer undergoes a dramatic transformation.

The EPR experiments indicate that this transformation is not only dramatic, but also irreversible. When the Li[2,6-PAQ] polymer synthesized in THF is exposed to the $(CH_3CN)_2LiTFSI/TTE$ solution and then re-suspended in THF, the EPR spectrum showed a broad component in addition to the well-resolved multiplet of Li[2,6-PAQ] as observed in THF. This broad component was observed even after 12 h of stirring the solution at 60° C., suggesting that the solvent molecules cannot reach into the particle core. The same applies to the polymer synthesized in the reaction of 2,6-PAQ with $Li_2S_4$ in the $(CH_3CN)_2LiTFSI/TTE$ solution that was suspended in THF. Only a broad EPR signal was observed, and the characteristic multiplet from the Li[2,6-PAQ] in THF did not recover even after 2 to 12 h stirring of this THF solution at 60° C.

The broadening of the EPR spectrum indicates poor averaging of magnetic anisotropies caused by the inhibited chain motions in the polymer coil. The latter can be expected if the polymer coil undergoes a hydrophobic collapse as the THF molecules (that complete the solvation shell of Li⁺ ions) are replaced by TTE molecules. Once the coil collapses, the trapped Li⁺ ions become shared by several functional units, and the polymer effectively becomes cross-linked. Consequently, the exposure of the collapsed polymer coil to THF does not cause the uncoiling of the polymer chains as the THF molecules cannot diffuse into the core to solvate Li⁺ ions.

Thus, the Li[2,6-PAQ] polymer in the TTE-containing solvate is structurally similar, but morphologically different from the same polymer in THF and acetonitrile. It is not presently clear whether these differences affect the electrochemical performance of 2,6-PAQ in the TTE-containing solvate electrolytes.

Figure 6:
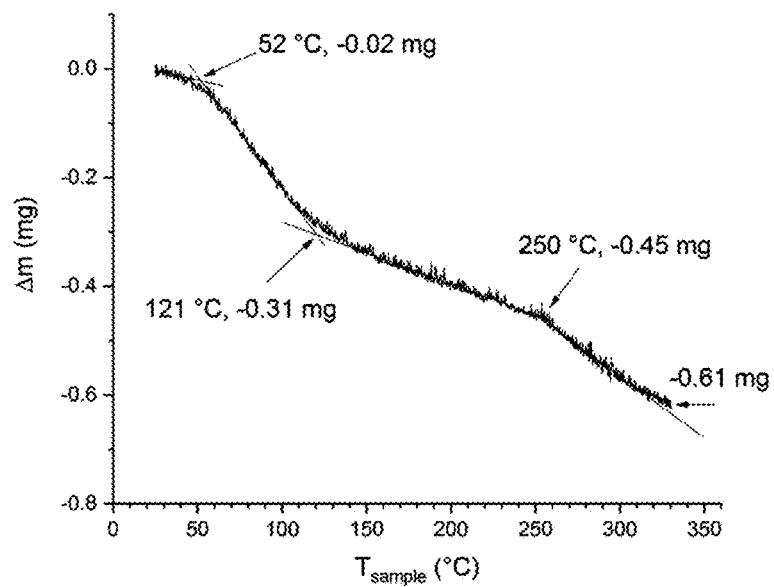
FIG. 6 provides a graph of mass loss in the Li[2,6-PAQ] sample (with the initial mass of 3.216 mg) during the programmed warming of this sample from 25° C. to 350° C.

To quantify the presence of the solvent in the Li[2,6-PAQ] material for magnetic measurement, two methods were used. With the first method, the dry powder was weighed and suspended in $CD_3CN$ that contained ferrocene as an internal standard. The proton NMR spectrum was obtained, and the resonance lines from the residual THF and pentane were integrated and compared to the ferrocene resonance. In this way, it was determined that the polymer sample contained about 9.3 wt % THF (which corresponds to 3 THF molecules per 10 units) and about 1.6 wt % pentane. For additional control, thermogravimetry analysis (TGA) was carried out using a PERKIN ELMER PYRIS 1TGA analyzer. The loaded sample (3.216 mg) was held at 30° C. for 5 min, and then the temperature was ramped to 350° C. at 5° C./min. The resulting mass loss is shown in FIG. 6. During the initial stage, about 0.6 wt % of the sample was lost, and in the second stage (the second linear section in the plot) about 10.3 wt % mass was lost at 120° C. The subsequent warming to 350° C. resulted in the gross loss of about 19 wt %. It is believed that this high-temperature mass loss was due to thermolysis of the polymer sample, whereas the mass loss below 120° C. corresponded to the removal of the residual solvent. The TGA estimate for the added mass of the solvent (10.3 wt %) is in excellent agreement with the $^1$H NMR estimate (10.9 wt %).

While these experiments probe only one reaction step postulated in Scheme 2, the redox reactivity of 2,6-PAQ toward $Li_2S_n$ has been demonstrated and the structure of Li[2,6-PAQ] has been established.

In order to gather evidence for the other reactions in Scheme 2, the effect of 2,6-PAQ on electrode surfaces was characterized by evaluating the surface morphology of cathodes and Li anodes after 50 and 200 cycles using SEM/EDS. Apart from the presence of 2,6-PAQ particles (about 5 μm) and fractures that resulted from cell disassembly, no discernible difference between $S_{cath}$ and S-PAQ$_{cath}$ cathodes could be definitively attributed to the presence of 2,6-PAQ in the cathode. After 50 cycles, however, the Li surface of $S_{cath}$ cell had extensive and uniform pitting, and was covered by densely agglomerated, S-rich particles of non-uniform size, whereas the Li surface of S-PAQ$_{cath}$ cell was much less corroded and/or covered by S deposits. Particles were more uniformly distributed and less densely packed, and had a size range between 50 and 100 μm. Unreacted Li surface (S concentration <2 at %) was observed in SEM images, and most of the Li surface of S-PAQ$_{cath}$ cell showed lower S concentration than that of $S_{cath}$ cell.

After 200 cycles, the Li surface of $S_{cath}$ cell had intensified pitting and a thick layer of S-rich surface reaction products. In contrast, the Li surface of S-PAQ$_{cath}$ cell had a non-uniform distribution of particles. A comprehensive semi-quantitative EDS analysis shows that most of the Li surface of $S_{cath}$ cell attained a S concentration greater than 60 at %. In contrast, for S-PAQ$_{cath}$ cells, the highest S concentration was less than 40 at %. Visually, the Li anode coupled with $S_{cath}$ showed a darkened surface with extensive black deposits, whereas the Li anode coupled with 2,6-PAQ still remained shiny with far less deposited material. Collectively, these results imply that 2,6-PAQ reduced the polysulfide crossover, reducing Li corrosion and atomic deposition of S species on Li.

XPS was carried out to probe the composition of the surface reaction products on Li anode surfaces after 200 cycles. Survey spectra of Li anodes from the $S_{cath}$ and S-PAQ$_{cath}$ cells reveal the presence of S, O, C, N and F atoms on the surface, and quantification of their relative concentrations reveals a lower overall atomic fraction of S atoms on the Li anode from the 5-PAQ$_{cath}$ cell, which is consistent with the EDS analysis. Deconvolution of the corresponding S 2p core level spectra reveals the deposition of $Li_2S$ (160.6 eV) and $Li_2S_n$ (161.7 eV) on Li metal, as well as a minor presence of elemental sulfur (163.4 eV). $SO_3^-$ signals resulting from the decomposition of LiTFSI (167.9 eV) and residual LiTFSI salt (169.6 eV) were also observed with both of these cells. The same XPS peaks were observed with a Li—Li symmetric cell that was cycled with the same electrolyte in the absence of S. Significantly, a higher degree of surface charging was observed during XPS measurements on Li from the $S_{cath}$ cell, requiring charge compensation and resulting in broader linewidths. This strongly suggests the presence of a thicker layer of insulating $Li_2S$ and $Li_2S_n$ deposits, which is consistent with the significantly different appearance of the cycled Li electrodes. Overall, the presence of 2,6-PAQ considerably reduces S deposition on Li. These SEM, EDS and XPS observations could all be naturally explained by the electrocatalytic action of 2,6-PAQ that reduces the polysulfide crossover to Li, thereby protecting Li surfaces.

XPS survey spectra of Li anodes from the $S_{cath}$ and S-PAQ$_{cath}$ cells revealed the presence of S, O, C, N and F atoms on the surface, and quantification of their relative concentrations reveals a lower overall atomic fraction of S atoms on the Li anode from the S-PAQ$_{cath}$ cell. This is consistent with the EDS analysis. Significantly, a higher degree of surface charging was observed during XPS measurements on Li from the $S_{cath}$ cell, requiring charge compensation and resulting in broader linewidths, strongly suggesting the presence of a thicker layer of insulating $Li_2S$ and $Li_2S_n$ deposits, which is consistent with the significantly different appearance of the cycled Li electrodes.

Semi-quantitative comparison of the deconvoluted F is core level spectra of these anodes suggested that LiF contributed to about 20% of the signal and 2-3 at % total on the surface. Li 1s core level spectra show little LiF formation and shifting of peaks to higher binding energies presumably due to surface charging. C is core level spectra showed overlapping signals from C—O, C=O, O=C—O species likely due to the decomposition of DME, which was used in washing Li, by Li. Very little signal corresponding to $Li_2CO_3$ and a $CF_3$ signal from LiTFSI were observed. The peak shape for the Li—Li symmetric cell may also be partially due to surface charging during measurement. O 1s core level spectra suggested a relatively higher fraction of $Li_2O_2/Li_2O_x$ on the surface of the Li anode from the S-PAQ$_{cath}$ cell, which is consistent with a higher oxygen atomic concentration on the Li anode from the S-PAQ$_{cath}$ cell, in comparison with the $S_{cath}$ cell. No peak at 528 eV was observed on any sample, indicating undetectable formation of $Li_2O$. An extra peak was present in the spectrum of the Li—Li symmetric cell, which strongly suggests surface charging. S 2p core level spectra revealed the deposition of $Li_2S$ (160.6 eV) and $Li_2S_n$ (161.7 eV) on Li metal, as well as a minor presence of elemental sulfur (163.4 eV). $SO_3^-$ signals resulting from the decomposition of LiTFSI (167.9 eV) and residual LiTFSI salt (169.6 eV) were also observed with both of these cells. The same XPS peaks were observed with a Li—Li symmetric cell that was cycled with the same electrolyte in the absence of S. Overall, the presence of 2,6-PAQ considerably reduces S deposition on the Li anode.

Ex. 5. Exemplary Li—S Battery Design

Figure 7:
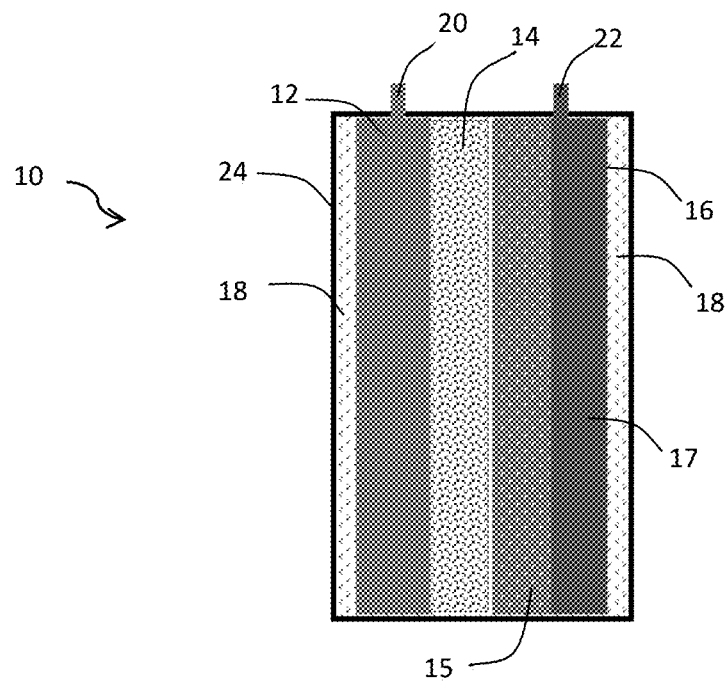
FIG. 7 provides a schematic representation of a Li—S battery as described herein.

FIG. 7 schematically illustrates a cross-sectional view of lithium-sulfur (Li—S) battery 10 comprising metallic lithium-containing anode 12 (e.g., Li metal foil, or metallic Li dispersed in a porous material such as nickel foam), cathode 16 comprising active layer 15 (e.g., sulfur, carbon and binder) and current collector 17, with a porous separator membrane 14 (e.g., a porous polyolefin membrane) between anode 12 and cathode 16. A non-aqueous, liquid lithium-containing electrolyte 18 contacts anode 12, membrane 14 and cathode 16. Electrical leads 20 and 22 contact anode 12 and cathode 16, respectively, and the entire battery 10 is sealed within a housing 24.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A lithium-sulfur (Li—S) battery cathode comprising elemental sulfur dispersed in a binder comprising 2,6-polyanthraquinone.

2. The cathode of claim 1, further comprising a current collector contacting the sulfur and the binder.

3. The cathode of claim 1, wherein the elemental sulfur and the binder are coated on an aluminum current collector.

4. The cathode of claim 1, wherein the cathode further comprises a carbon material dispersed in the binder.

5. The cathode of claim 1, wherein the 2,6-polyanthraquinone has a number average molecular weight of about 60 kDa to 80 kDa and a polydispersity index of about 2 to about 2.2, as determined by reduction of the 2,6-polyanthraquinone with about 2 equivalents of lithium naphthalenide per anthraquinone unit thereof, followed by gel permeation size exclusion chromatography using a chromatography medium comprising a highly cross-linked polystyrene-divinylbenzene gel and narrow dispersity polystyrene standards with tetrahydrofuran as eluent.

6. The cathode of claim 1, wherein the 2,6-polyanthraquinone comprises about 50 to about 66 percent by weight (wt %) of the binder.

7. The cathode of claim 1, wherein the 2,6-polyanthraquinone comprises about 50 wt % of the binder.

8. The cathode of claim 1, wherein the binder further comprises at least one other binder compound in combination with the 2,6-polyanthraquinone.

9. The cathode of claim 8, wherein the at least one other binder compound comprises polyvinylidene difluoride.

10. The cathode of claim 1, wherein the cathode comprises about 50 wt % of $S_8$, about 20 to about 40 wt % of a carbon material, and about 10 to about 30 wt % of the binder.

11. A lithium-sulfur (Li—S) battery comprising:
    (a) an anode comprising metallic lithium;
    (b) a cathode comprising elemental sulfur dispersed in a binder comprising 2,6-polyanthraquinone;
    (c) a porous separator membrane between the anode and the cathode; and
    (d) a liquid electrolyte composition comprising a lithium salt dissolved in a non-aqueous organic solvent contacting the anode, the cathode, and the membrane.

12. The battery of claim 11, wherein the cathode further comprises a current collector contacting the sulfur and the binder.

13. The battery of claim 11, wherein the elemental sulfur and the 2,6-polyanthraquinone are coated on an aluminum current collector.

14. The battery of claim 11, wherein the cathode further comprises a carbon material dispersed in the binder.

15. The battery of claim 11, wherein the 2,6-polyanthraquinone has a number average molecular weight of about 60 kDa to 80 kDa and a polydispersity index of about 2 to about 2.2, as determined by reduction of the 2,6-polyanthraquinone with about 2 equivalents of lithium naphthalenide per anthraquinone unit thereof, followed by gel permeation size exclusion chromatography using a chromatography medium comprising a highly cross-linked polystyrene-divinylbenzene gel and narrow dispersity polystyrene standards with tetrahydrofuran as eluent.

16. The battery of claim 11, wherein the 2,6-polyanthraquinone comprises about 50 to about 66 wt % of the binder.

17. The battery of claim 11, wherein the 2,6-polyanthraquinone comprises about 50 wt % of the binder.

18. The battery of claim 11, wherein the binder comprises at least one other binder compound in combination with the 2,6-polyanthraquinone.

19. The battery of claim 18, wherein the at least one other binder compound comprises polyvinylidene difluoride.

20. The battery of claim 11, wherein the cathode comprises about 50 wt % of $S_8$, about 20 to about 40 wt % of a carbon material, and about 10 to about 30 wt % of the binder.

* * * * *